J. & E. Arthur,
Cutting Leather,
№ 13,296.
Patented July 24, 1855.
Fig. 1.
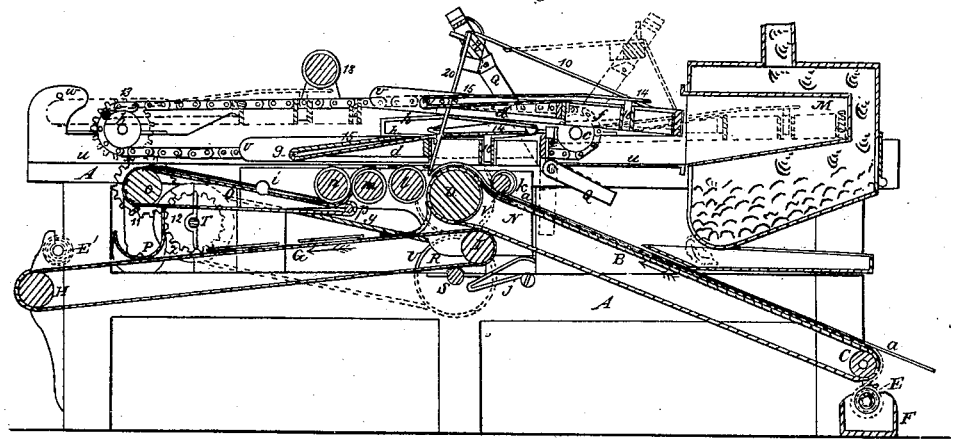
Fig. 3.
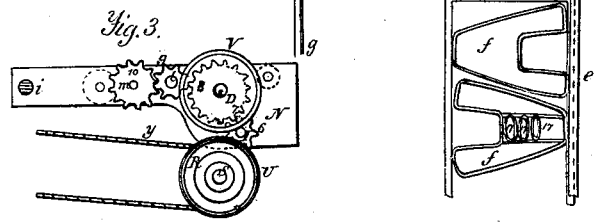
Fig. 4.
Fig. 5.
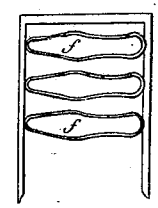
Fig. 2.
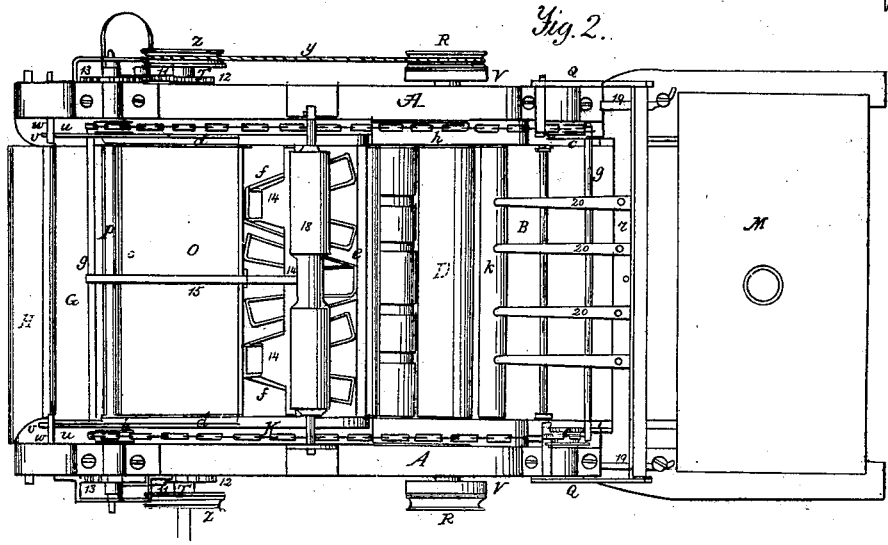

UNITED STATES PATENT OFFICE.

JOHN ARTHUR AND EVAN ARTHUR, OF NEW BRUNSWICK, NEW JERSEY.

MACHINE FOR CUTTING BOOT AND SHOE UPPERS, SOLES, &c., FROM SHEETS OF INDIA-RUBBER.

Specification of Letters Patent No. 13,296, dated July 24, 1855.

*To all whom it may concern:*

Be it known that we, JOHN ARTHUR and EVAN ARTHUR, of New Brunswick, in the county of Middlesex and State of New Jersey, have invented certain new and useful Machinery for Cutting Out Sheet India-Rubber for the Manufacture of Overshoes and other Articles; and we do hereby declare that the following is a full, clear, and exact description of the same, reference being had to the accompanying drawings, forming part of this specification, in which—

Figure 1, is a longitudinal vertical section of the machinery. Fig. 2, is a plan of the same. Fig. 3, is a side view of the principal part of the gearing of the machine. Fig. 4, is a plan of one of the die frames and dies employed in cutting out the rubber. Fig. 5, is a plan of another set of dies detached from the die frame.

Similar letters of reference indicate corresponding parts in the several figures.

The principal feature of this invention consists in the employment of heated metal dies to cut out the rubber while the latter is placed upon a wetted surface. The other features of the invention consist in certain mechanism employed in combination with a stove for carrying the dies back and forth, first to the stove to be heated and then to the rubber to perform the cutting operation, also in certain apparatus for carrying the rubber in a long sheet or piece to be submitted to the cutting operation, carrying away the pieces cut out in one direction and the waste in another direction, and in certain other devices and appliances necessary to complete a machine by which a piece of india rubber can be rapidly cut up into pieces of any desired shape and form.

A, is a strong framing which carries all the working parts of the machine.

B, is an endless apron, of cloth, india rubber, or other suitable material, moving intermittently in the direction of the arrows shown near it in Fig. 1, around two rollers C, D, one of which is placed near the bottom of one end of the machine and the other near the top of the machine midway of its length. This apron is of a width about equal to the width of the roll or piece of india rubber which is to be cut up.

G, is another endless apron running in the direction indicated by arrows near it, around two rollers H, I, one of which is situated at the opposite end of the machine to the roller C, and the other below the roller D. Below the roller C, is arranged a roller E, which dips into a trough of water and on this roller is wound a piece of woolen or other sufficiently absorbent cloth J, represented in red color in Fig. 1, which rolls in water in a trough F, situated below the roller E. The above cloth saturated with water is conducted over the upper surface of the apron B, and over the roller D, on to the apron G, and upon it lies the piece of india rubber to be cut up, which is represented by a dark colored line a, a, supposed to be coming from a roll conveniently situated, but not shown. The cloth J, should be of a length not less than the piece of india rubber.

Above the roller D, there are arranged at opposite sides of the machine and at a distance apart greater than the width of the aprons and piece of india rubber a, a, two endless chains K, K, running continually in the direction of the arrow shown upon them, each around two rollers b, c. To these chains are connected the die frames of which there may be any suitable number; these frames are composed each of two long side pieces d, d, and a cross piece e, the said side pieces and cross piece, having grooves in their inner faces to receive the dies f, f, of which a number are attached together, these dies are made of thin plate steel or other metal set edgewise to produce an edge of the desired form and are arranged side by side in such manner as to cut a row of patterns from the whole width of the piece of rubber, with as little waste as possible. The dies are slid into the frame from the end opposite to that having the cross piece e, and right up to the cross piece near the end v, farthest from the cross piece, is connected to both the endless chains by a pivot g, which extends across from one chain to the other. The chain gives a reciprocating motion to the die frames and dies carrying the dies into a stove M, at one end of the machine as represented in red outline in Fig. 1, and then carrying them in contact with the india rubber as the latter is carried by the apron B, over the roller D. When a set of dies is passing over the roller D, the sides of the die frames, come under plates h, h, which may be considered as the platen of a press, and are secured to the sides of the frame A, and the dies are thus forcibly held down in contact with the rubber as it passes over the roller and as at this time the apron B, and the rubber receive motion in the same direction at the same speed, as the dies, a perfect impression of the heated edges of the dies is left upon the rubber cutting or rather melting it through and taking out a number of patterns of a size and form corresponding with the interior of the dies.

In order that the rubber may be held up to the dies with a proper but not too great pressure, the roller D, is hung in a frame N, which is capable of vibrating to a certain extent, on pivots $i$, secured in the sides of the framing A, and this frame is held up by springs $j$, see Fig. 1, which give the desired pressure to the roller D. Behind the roller D, there is a roller $k$, which presses upon the india rubber and keeps it tight over the roller D, and in front of the roller D, is another roller $l$, between which and the roller D, the patterns of rubber cut out by the dies are conducted to the apron G, while the waste still remaining attached to the piece $a$, $a$, passes over the roller $l$, and over another roller $m$, then between the roller $m$, and a roller $n$, by which it is conducted on to an apron O, which runs on two rollers $o$, $p$, and by the said apron conveyed to an inclined trough P, by which it is conveyed out at one side of the machine. The front ends of the patterns, as soon as they are cut from the piece, are directed between the rollers D, $l$, by means of a number of thin metal fingers, 20, one or more for each pattern attached to a bar $r$, which is secured to a swinging frame Q, which swings on a fixed pivot $s$, passing through the frame A. This frame Q, has a small tongue $t$, see Fig. 1, which, just as one set of dies are commencing their operation, is struck by the end of the die frame which has arrived at the proper position at the right time, and the said frame Q is thereby thrown down with its fingers upon the points of the patterns to force them between the rollers D, $l$, by which they are instantly seized and caused to follow with the wet cloth along the apron G. The frame Q, after the fingers have done this is raised by two springs 19, 19. The prompt action of these fingers prevents the curling up of the edges of the patterns. In order to allow the fingers to enter between the rollers D, $l$, the roller $l$, is grooved as shown in Fig. 2, at proper intervals. This roller $l$, may be made parallel and be furnished with movable collars of a width suitable to the patterns, spaces being left between the collars for the fingers 20, to fall into. The movement of each die frame $d$, $d$, $e$, with its set of dies $f$, $f$, continues in the same direction as the india rubber, after the cutting operation has been performed until its pivot $g$, by which it is attached to the chains, passes the rollers $b$, when the direction of its motion is reversed. During this reversed or back motion of the die frame, it requires to be raised to allow room for other die frames with their dies to come into operation on the rubber, the end $v$, which, nearest the pivot $g$, attaches it to the chains, is raised by the movement of the chain itself but the other end, which during all that part of its motion in the same direction as the rubber, except just during the cutting operation, rested upon ledges $u$, $u$, which extend along the framing, is raised, as shown in Fig. 1, in blue outline, by the ends $g$, of the side pieces striking against stationary pins $w$, secured one to each side of the frame A, and by that pin is held up till it comes on to the top of the plates $h$, $h$, by which it is supported as long as necessary. The backward movement of the die frame, carries the die into the stove M. The movement of the die frame is again changed by the pivot $g$, passing around the pulleys $c$, $c$, and when it leaves the stove, it falls on the ledges, $u$, $u$, where it rests till the dies come into the roller D. In order to retard as much as possible the movement of the die while in the stove and give it time to be properly heated, the pulleys $c$, $c$, should be as large as is consistent with the proper arrangement and working of other parts of the machine and in order to prevent the die cooling more than is unavoidable, the roller D, should be as near as possible to the stove.

It will be understood that in order to cut out the successive rows of patterns from the piece of rubber without waste, the india rubber must have an intermittent motion, only moving the length of a pattern at a time. This movement of the roller might probably be produced by the friction of the dies in passing over but in order the better to insure the proper movement, there is a shaft S, working in fixed bearings and carrying a pulley R, see Fig. 3, to receive a continuous motion through a belt $y$, from a pulley $z$, on the main shaft T. This shaft S, carries two rollers U, U, one at each end faced with india rubber and on the ends of the roller D, are two similar rollers V, V, opposite to U, U. When the dies arrive above the roller D, they force it down and bring the rollers V, V, into contact with the rollers U, U, which revolving at a proper speed give motion to the rollers V, V, and to the roller D. The apron G, derives motion through a spur wheel $b$, see Fig. 3, on the shaft of its roller I, from a spur wheel 7, on the shaft of the roller D, and consequently its motion like that of the apron B, is intermittent. The roller $l$, is geared to the roller D, and the roller $m$, to the roller $l$, by spur wheels 8, 9, 10, see Fig. 3. The apron O, receives a continuous motion through a spur wheel 11, on its roller $o$, and from a spur wheel 12, on the main shaft T. The chains K, K, receive motion through spur wheels 13, on their rollers $b$, from the spur wheels 11, of the rollers $o$.

The chains K, K, may carry as many die frames and sets of dies as may be convenient though only two are shown. One of the sets of dies represented cuts soles, and the other uppers for india rubber overshoes, but it will be generally more convenient and economical to use dies all of the same kind. In cutting the uppers of sandal overshoes or other articles requiring holes in them, the pieces cut out to form the holes would remain within the die unless some means were taken to remove them. In order to eject these pieces from the die, we propose to employ a bar 14, attached by a spring 15, to the pivot $g$, or other convenient part of the die frame, said bar having attached to it a number of fingers 16, to enter the openings 17, in the die, shown, in Fig. 4. These fingers are always held up by the spring some distance above the edges of the dies, except for an instant just after the raising of the die frame, to commence its back motion as shown in blue outline in Fig. 1, when the bar is caused by the raising of the die frame to strike under a roller 18, hung in fixed bearings above the frame A, and is depressed relatively to the die frame, far enough for the fingers 16 to push out the pieces which were retained within the dies after their last cutting operation. The pieces thus expelled from the dies, fall on the waste apron O, and are by it conveyed to the waste trough P.

The construction of the stove M, needs no particular description as it may be such as may be found suitable for the purpose and any fuel may be employed.

Between the stove and the roller D, there may be a roller rolling in a trough of whiting, powdered chalk, or other suitable material for the die to roll over and take up a portion of the powder to prevent adhesion to the rubber, but this probably may not be necessary.

The wet cloth J, is taken up by a roller E′, whose journals fit a suitable guide at the front end of the machine. This roller rests on the apron G, and derives motion therefrom and the cut patterns are rolled up with it, each row being separated from, and thus prevented sticking to the others, by an interposed layer of cloth. The roller, E′, is like that, E, and a number of these rollers are kept on hand. When the cloth is all rolled on E′, it is unrolled from it and rolled on to another roller, the cut patterns being removed as it is rolled off. The roller with the cloth is then put in the place of E, and the empty roller put in the place of E′.

The cutting of india rubber upon a wetted cloth or other moistened absorbent surface with a heated die or stamp, enables the pattern to be produced with less power and with a better edge. Without the wetted surface or something equivalent the melted edges would stick to the surface upon which the cutting or separation by melting was performed, and in some places after the pattern had been separated from the piece by the melting operation, the edges would reunite and there would be danger of the burning of the surface upon which the cutting or melting was performed, but the wetted cloth protects the surface from being burned by the die and prevents adhesion of the melted edges thereto, and also the reunion of the edges.

The cutting operation may be facilitated by heating the roller D; this may be done by making it hollow and admitting steam through it. By this means the rubber may be so much softened that it might be cut through without heating the die to any very great degree or if the edges were very sharp, perhaps without heating at all, but we prefer always to use the heated die as then the edges will not require sharpening and consequently not be liable to get out of order.

What we claim as our invention and desire to secure by Letters Patent, is,

1. The cutting or separation of india rubber by placing it on a wet cloth or other suitable moistened surface, and submitting it to the pressure of a heated die having an edge of the form of the article to be cut, substantially as herein set forth.

2. The combination of one or more reciprocating die frames each carrying a set of dies with a stove and with carrying and pressing apparatus to carry the sheet or piece of rubber substantially as herein described, so that the dies by their reciprocating movement may be carried into the stove to be heated and then returned to cut or stamp out the pattern or article from the piece as herein fully set forth.

3. The method of raising the die frames to carry the dies, on their return movement toward the stove, far enough above the roller D, for other die frames to pass below them by extending the ends $v, v$, of the side pieces $d, d$, of the said frames some distance beyond the pivots $g, g$, which connect them with the chain, and providing pins $w, w$, for the ends $v, v$, of the die frames to strike against to throw up the opposite ends carrying the dies, substantially as herein described.

4. The swinging frame $r$, with its fingers 29, arranged and operating substantially as described, to conduct the points or ends of the patterns as soon as they are cut or separated, between the roller D, upon which the cutting is performed and another roller $l$, by which they are at once prevented curling it and are conveyed along toward where they are delivered from the machine.

JOHN ARTHUR.
EVAN ARTHUR.

Witnesses:
Jos. Geo. Mason,
Wm. Tusch.